(No Model.)

J. R. MONTAGUE & J. A. PROSS.
JOURNAL BEARING.

No. 480,025. Patented Aug. 2, 1892.

WITNESSES:
B. W. Miller
Baltus De Long

INVENTORS
JOHN R. MONTAGUE
JOHN A. PROSS
BY
Baldwin Davidson & Wright
ATTORNEYS.

UNITED STATES PATENT OFFICE.

JOHN RICHARD MONTAGUE AND JOHN ADAM PROSS, OF SYRACUSE, NEW YORK.

JOURNAL-BEARING.

SPECIFICATION forming part of Letters Patent No. 480,025, dated August 2, 1892.

Application filed November 2, 1891. Serial No. 410,642. (No model.)

*To all whom it may concern:*

Be it known that we, JOHN RICHARD MONTAGUE and JOHN ADAM PROSS, citizens of the United States, residing at Syracuse, in the county of Onondaga and State of New York, have invented certain new and useful Improvements in Journal-Bearings, of which the following is a specification.

The primary object of our invention is to provide an improved journal-bearing for shafting which will permit it to revolve at a high rate of speed with a minimum amount of friction, wear, and lubrication. We employ anti-friction balls and anti-friction rollers and arrange them in a novel way in a box or housing of an improved construction.

Figure 1:
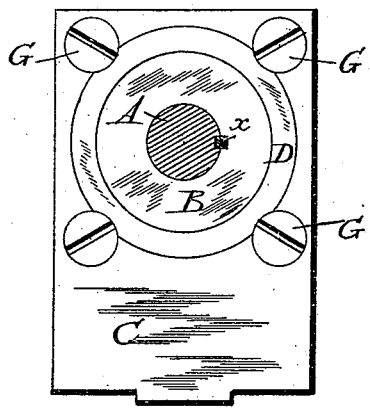
Figure 2:
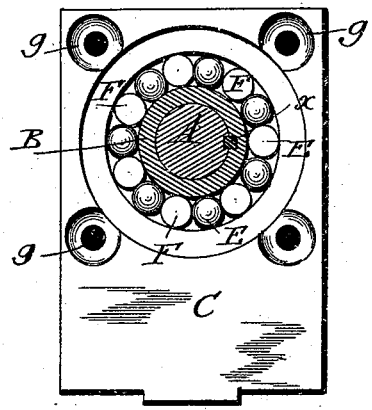
Figure 3:
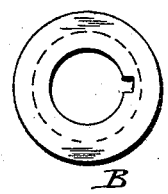
Figure 4:
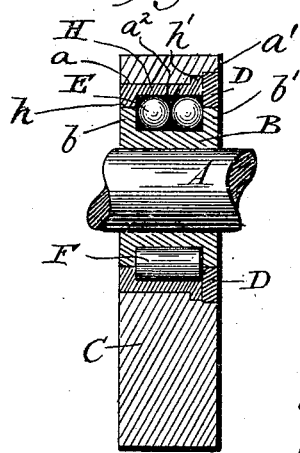
Figure 6:
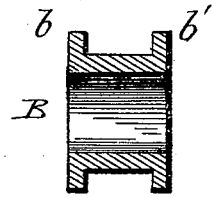
Figure 5:
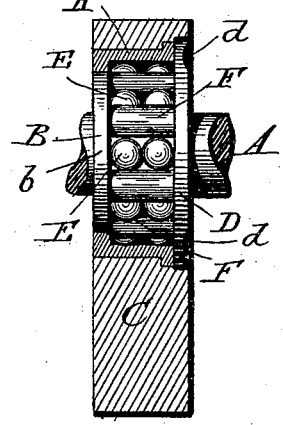
Figures 7, 8:
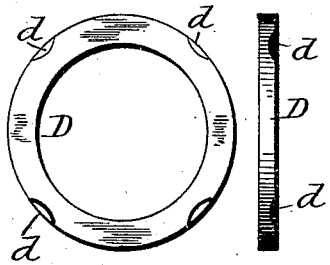

In the accompanying drawings, Figure 1 is an end view of our improved journal-bearing with the shaft in section; Fig. 2, an end view with the securing-ring removed and the shaft and its sleeve in section; Fig. 3 an end view of the sleeve through which the shaft extends; Fig. 4, a vertical central section with the shaft in side elevation. Fig. 5 shows a side view of the shaft, the anti-friction devices, and their supports, the bearing-block being shown in section. Fig. 6 is a longitudinal central section of the sleeve, and Figs. 7 and 8 are respectively end and side views of the securing-ring.

To the shaft A is keyed a sleeve B, formed at its ends with radially-projecting flanges $b$ $b'$ of equal diameters. The shaft extends through an opening in the bearing-block C, this opening being of a size and shape to accommodate the sleeve B, the anti-friction devices carried thereby, and the bushing H. One of the flanges $b$ of the sleeve fits closely within the flanged end $h$ of the hard-steel bushing H, but is free to revolve therein. The block C may be of any material, preferably steel, the bushing H being of hardened steel, formed at one end with an inwardly-projecting flange $h$ and at its opposite end with a radially-projecting flange $h'$, which fits in an annular recess $a'$ in the block C. Within an annular recess $a'$, formed around the opening at one side of the block, is seated a securing-ring D, the inner diameter of which corresponds approximately with the outer diameter of the flanged end $b'$ of the sleeve B, which it closely surrounds, but in which it is free to revolve.

The ring D is secured to the block by screws G, the heads of which overlap the edges of the ring and occupy recesses $d$ therein. They also fit in recesses $g$ in the face of the block, so that when driven home the heads of the screws are flush with the face of the block.

Between the flanges $b$ and $b'$ of the sleeve are interposed a series of sets of anti-friction balls E and a series of rollers F, which are all of a diameter sufficient to extend beyond the flanges into the recess $a^2$, formed between the flange $h$ and the ring D. The rollers F are slightly greater in diameter than the balls. They are all true cylinders, equal in diameter from end to end, and the balls are true spheres. The balls and cylinders are arranged alternately in circular series around the shaft. As shown, each roller F is separated from those on opposite sides of it by sets of balls, each set being about equal in length to that of the rollers. The balls and rollers are arranged sufficiently close together to keep the rollers in line with the shaft, but they are not so closely arranged as to bind each other or to prevent their free rotation.

The arrangement above described is a most efficient one. It possesses an advantage over a bearing composed entirely of rollers, because when such rollers or cylinders are arranged in contact with each other a considerable amount of friction is caused by the resistance incident to the contacting-surfaces of adjacent rollers, which, it is evident, always revolves in opposite directions. The balls afford the minimum amount of contacting-surface, and thus the friction is reduced to a minimum. There would be less contact-surface if balls alone were employed, but it is difficult to keep the balls in such a bearing in proper working position. Again, balls do not afford sufficient bearing or supporting surface, but the cylinders do, the balls in our bearing being principally employed to keep the cylinders in line and to prevent their frictional contact with each other. No recesses are formed in the rollers in our journal-bearing. They are true cylinders from end to end.

Each set of balls is about equal in length to a cylinder, so that a symmetrical arrangement affording uniform resistance is produced, and the balls which engage with cylinders running at a uniform speed will also revolve uniformly. The sleeve B revolves with the shaft, and the cylinders and balls revolve freely within the housing formed between the flanges of the sleeve and the recessed opening in the block. By removing the ring D and the key $x$ the sleeve may be withdrawn from the bearing-block and it may be as readily replaced.

The fastening devices are used on only one side of the block. The ring D when secured in place holds the flanged bushing H securely in its seat, and endwise movement of the balls and cylinders is thus prevented. There is, however, very little tendency to endwise movement, so that there is not sufficient strain to produce appreciable friction.

We claim as our invention—

1. A journal-bearing consisting of the combination, substantially as hereinbefore set forth, of a series of rollers of uniform diameter from end to end, a series of sets of balls arranged between the rollers, and means for holding the rollers and the balls in position.

2. A journal-bearing consisting of the combination, substantially as hereinbefore set forth, with a housing, of a series of rollers and a series of sets of balls arranged between the rollers, each roller being a little greater in diameter than that of each ball and about equal in length to each set of balls.

3. The combination, substantially as hereinbefore set forth, of a shaft, a flanged sleeve secured thereto, a bearing-block formed with a recessed opening, within which the sleeve is arranged, a series of rollers arranged between the flanges, and a series of sets of balls also arranged between the flanges and between the rollers.

4. The combination, substantially as hereinbefore set forth, of a shaft, a flanged sleeve secured thereto, a bearing-block formed with a recessed opening, within which the sleeve is arranged, a bushing seated in the opening and interposed between the sleeve and the block, a series of rollers arranged between the flanges, and a series of sets of balls arranged between the flanges and between the rollers.

5. The combination, substantially as hereinbefore set forth, of a shaft, a flanged sleeve secured thereto, a bearing-block formed with a recessed opening, within which the sleeve is arranged, a series of rollers, a series of sets of balls arranged between the flanges, and the securing-ring which closes the opening at one side of the bearing-block and serves to hold the parts in position.

In testimony whereof we have hereunto subscribed our names.

JOHN RICHARD MONTAGUE.
JOHN ADAM PROSS.

Witnesses as to J. R. Montague:
  WM. D. BALDWIN,
  LLOYD B. WIGHT.
Witnesses as to J. A. Pross:
  C. E. LIPE,
  A. A. SCHENCK.